United States Patent [19]
Hart

[11] 3,934,671
[45] Jan. 27, 1976

[54] STARTER ENABLING-DISABLING IGNITION SAFETY SEAT BELT FOR MOVING VEHICLES

[76] Inventor: Robert L. Hart, 1525 Olive St., Indianapolis, Ind. 46203

[22] Filed: Oct. 10, 1974

[21] Appl. No.: 513,476

[52] U.S. Cl. ..... 180/82 C; 200/61.58 B; 307/10 SB; 340/52 E
[51] Int. Cl.² ........................................ B60R 21/02
[58] Field of Search ................ 280/82 C; 340/52 E; 307/10 SB; 200/61.58 B

[56] References Cited
UNITED STATES PATENTS
3,588,811  6/1971  Prickett............................ 340/52 E
3,806,867  4/1974  Quantz............................. 180/82 C

*Primary Examiner*—Leo Friaglia
*Assistant Examiner*—John A. Pekar
*Attorney, Agent, or Firm*—Woodard, Weikart, Emhardt & Naughton

[57] ABSTRACT

A seat belt buckle means which provides a connection for one or more opto-electric circuits (control circuits employing light for control of electrical circuits) as an incident to the establishing of the mechanical supporting connection of the buckle means, the respective portions of the opto-electrical connection being respectively operatively aligned with the buckle member components which establish the mechanical supporting connection, thus providing that the opto-electrical connectors are operatively engageable with one another whenever but only whenever the mechanically-acting buckle member components are operatively engaged, and thus correspondingly assuring that establishment and dis-establishment of the opto-electrical circuitry will be coincident with the establishment and dis-establishment of the mechanical supporting connection of the buckle means, in an arrangement in which the thief-resistant starter switch is provided as a part carried on one of the seat buckle components.

4 Claims, 5 Drawing Figures

STARTER ENABLING-DISABLING IGNITION SAFETY SEAT BELT FOR MOVING VEHICLES

This invention relates to thief resistant seat buckles, as for vehicles such as automobiles and trucks.

The provision of seat buckles for vehicles is becoming increasingly more common, and many governmental jurisdictions are requiring their presence due to the increased safety they provide in case of many types of vehicle accidents.

But many persons, due to carelessness, forgetfulness, or whatever, do not bother to buckle the seat belt provided; and it seems that no amount of safety education or reminders have succeeded or can succeed in causing full adherence to the safety precaution of buckling the seat belt.

Accordingly, the present invention provides a novel and automatically effective interlock between the seat belt and certain electrical circuitry of the vehicle, automatically requiring that the seat belt be buckled prior to driving the vehicle, and providing that the user is automatically compelled to touch one of the belt's buckle members even to turn on the vehicle's ignition switch.

BRIEF DESCRIPTION OF THE DRAWINGS

The above description is of an introductory and generalized nature. More particular details, features, components, and concepts of the invention are set forth in the accompanying more detailed description of an illustrative embodiment, taken in conjunction with the accompanying somewhat schematic drawings, in which.

DESCRIPTION OF THE PREFERRED EMBODIMENT

Figure 1:
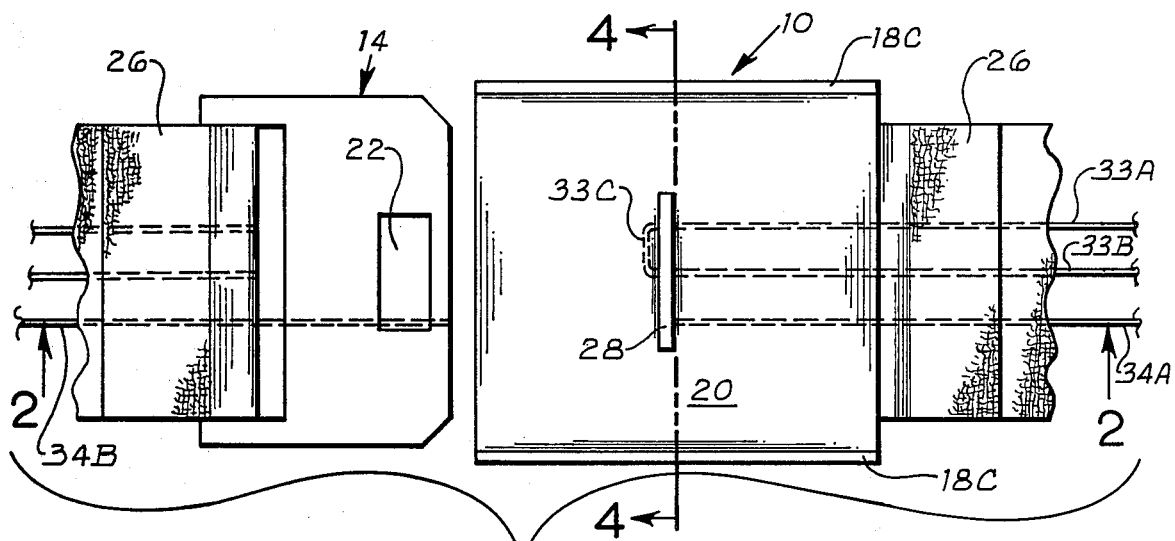
FIG. 1 is a plan or face-on view of a buckle assembly, the co-operating buckle members being shown in disassembly thereof, and illustrating the vehicle's ignition key directly above a slot carried on one of the belt's buckle members.
Figure 2:
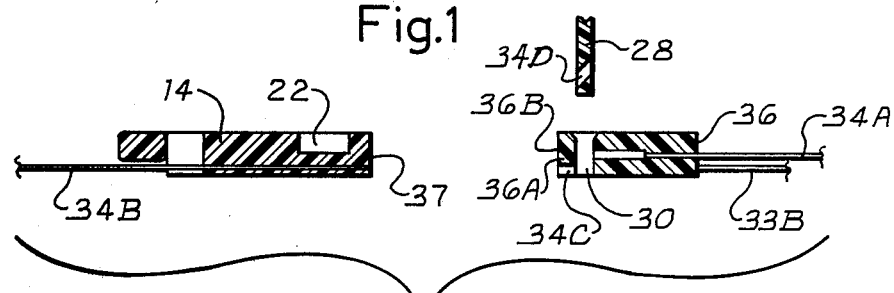
FIG. 2 is an enlarged detail cross-sectional view taken at line 2—2 of FIG. 1 and viewed in the direction of the arrows.

As shown in the drawings, the present invention provides a seat belt buckle providing a connection means for establishing one or more opto-electric circuits upon the establishing of the mechanical supporting connection of the buckle means, with the vehicle's ignition key being carried on one of the buckle components, thus providing that the buckle components not only must be latched, but also that one of the buckle members be actually touched even to turn on the vehicle's ignition switch.

The buckle assembly with respect to mechanical supporting means, may be generally of conventional construction. That is, it has first and second co-operating buckle members 10 and 14 releasably engageable for establishing the mechanical supporting connection of the buckle means whereby the seat belt straps 26 are fastened together; and this latched engagement is provided by inserting member 14 manually into the slot 16 in member 10 between a back plate 18 and a cover plate 20 of the other buckle member 10. Plate 20 is spring loaded in the direction of the arrow 19 by spring 21 affixed to member 18B extending between walls 18C affixed to backplate 18.

Co-operating latch socket 22 of the member 14 and latch bar 23 affixed to plate 20, releasably retain an assembled condition of the buckle members 10 and 14, when they are engaged as just indicated, by movement toward one another along the axis of the seat buckle straps 26 to which they are connected.

Figure 5:
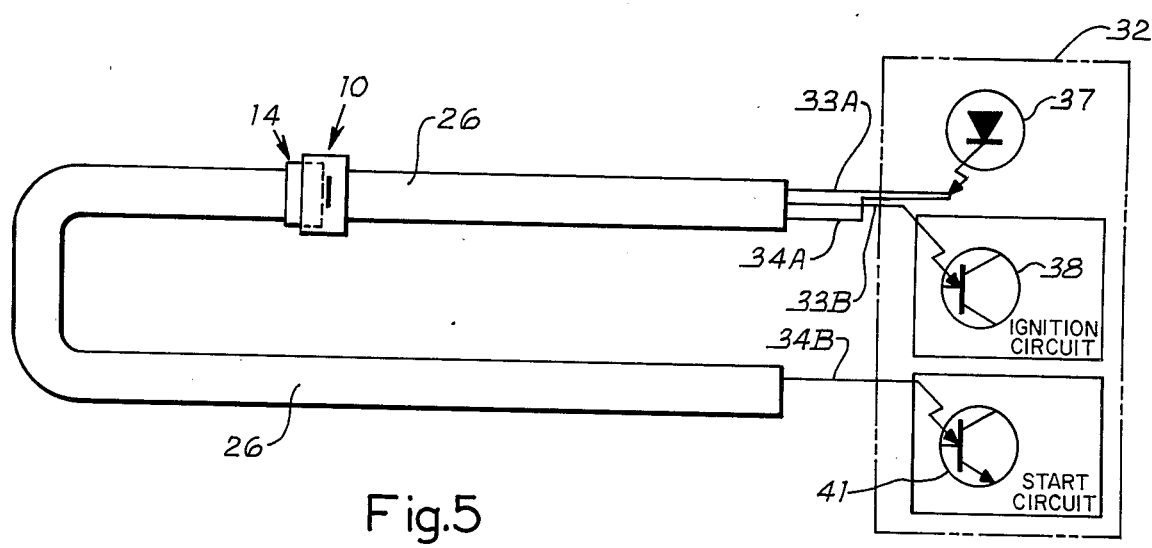
FIG. 5 is a schematic view of the opto-electrical circuitry of the vehicle.

According to concepts of this invention, there are provided optical conductor means on each of the buckle members 10 and 14, and in the belt-straps 26. These are used to enable or disable engine ignition and starting electrical circuitry in box 32 in FIG. 5. The key 28 received through slot 29 in cover plate 20 and into slot 30 in back 18 co-operates in this function.

Thus, not only do the buckle components 10 and 14 have to be latched together in order to complete the opto-electrical circuitry in the buckle, belts and box 32, but the need of the vehicle's ignition key 28 in between portions of the buckle member 10 forces the user to touch that buckle member in turning on the vehicle's ignition even if he tries to avoid latching the buckle members together.

The said optical conductor means include optical light pipes 33A, 33B, 34A, and 34B in belts 26, with 33A, 33B, and 34A being continued through opaque block 36 affixed to back 18, and terminating at slot 30. A return loop 33C is embedded in portion 36A of block 36 facing the slot 30. Pipe 34B extends through buckle member 14 to the end thereof abutting block 36 at 37. A short length 34C of light pipe is embedded in block portion 36A between the end 36B thereof and slot 30.

Key 28 has three short lengths of light pipe therein, 33D, 33E, and 34D. When the key is in the position shown in FIG. 3, the pipes 33D and 33E therein register with pipes 33A and 33B respectively, and 33C to complete an optical light path from a light emitting diode (LED) 37 in box 32 to a photo-sensitive transistor 38 in box 32. Transistor 38 is an ignition control transistor and, when activated in response to light thus received, turns on the engine ignition. When the key is pushed down against the resistance of spring 39 in buckle member 10, light pipe 34D therein registers with light pipes 34C and 34A to complete a light pipe path from LED 37 thorough pipes 34A, 34D, 34C and 34B, in that order, to photo-sensitive transistor 41 which, when light-activated, turns on the engine starter motor. Details of the ignition circuit and starter circuit in box 32 are not shown because such are so well known and not per se features of this invention.

It will be noted that the optical light pipe portions 34B and 34C for the starter control are operatively aligned or in registry with each other in the buckle members 14 and 10 (which with latch components 22 and 23 establish the mechanical supporting connection) only when latching is effected. Light pipe portion 34D in the key is aligned with portions 34A and 34C in block 36 only when the key is pushed in fully against the spring 39 and thus is operable to start the engine whenever but only whenever the mechanically-acting buckle members 10 and 14 (with member 14 fully in slot 16) are operatively engaged. This assures that a pre-requisite for establishment of the opto-electrical circuitry for the starter is the establishment of the mechanical supporting connection of the buckle means;

and thus it assures that the buckle members 10 and 14 will be buckled to close the opto-electrical starter circuitry.

Figure 3:
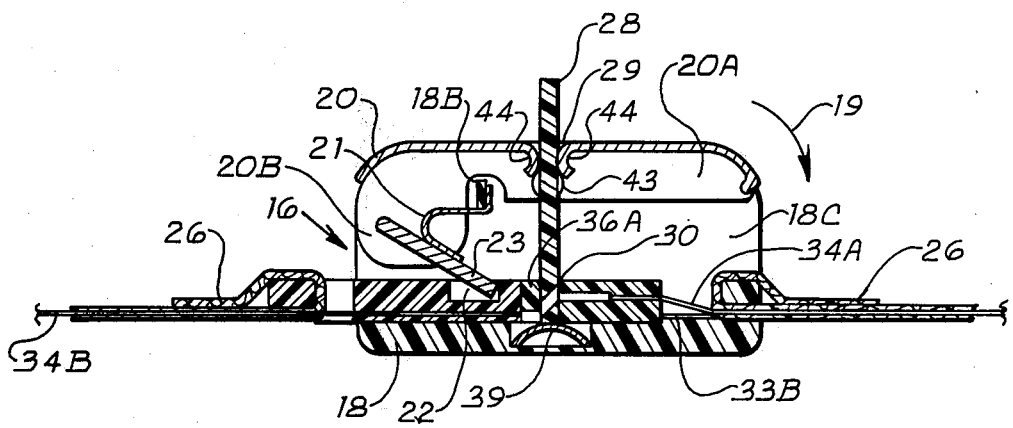
FIG. 3 is a view like FIG. 2, but with the buckle members connected (seat belt fastened).
Figure 4:
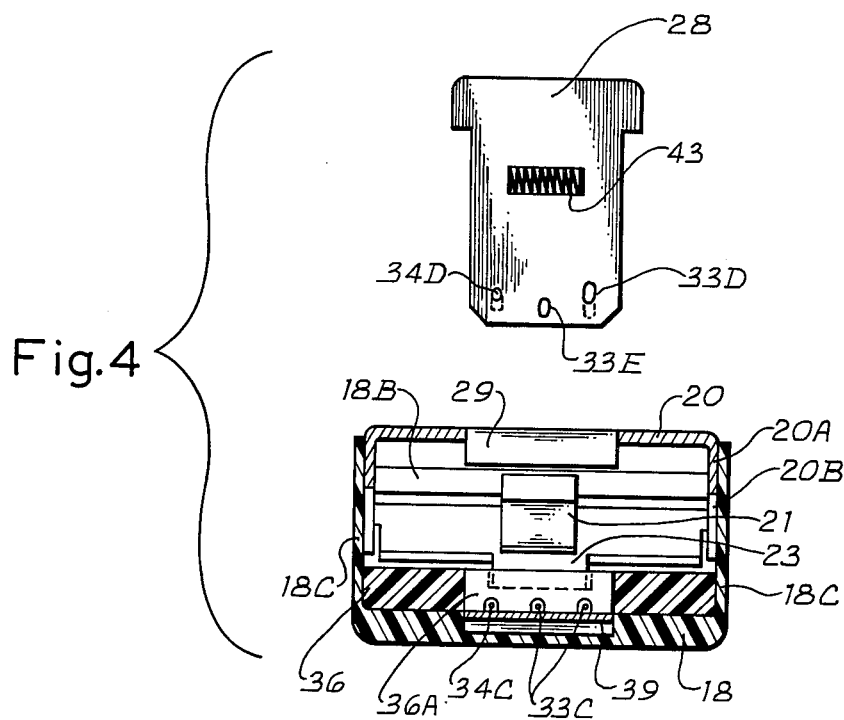
FIG. 4 is an enlarged cross section taken at line 4—4 in FIG. 1 and viewed in the direction of the arrows.

As a safety feature, the short lengths of light pipe in the key are of sufficient size to insure registry thereof at all times that the key is in slots 29 and 30 far enough that the coil detent spring 43 in the key is under the retainer faces 44 in the cover plate 20 regardless of whether the key is pushed in fully for starting the engine, or only to the position shown in FIG. 3 for establishing and maintaining the ignition on.

Reference numerals 20A and 20B represent integral side walls of the cover plate, disposed immediately inboard of side walls 18C of the buckle back 18. Only three optical light pipes are shown in the straps, although depending upon the circuitry to be monitored or controlled by the seat belt, and buckle and key, more of these optical light pipes may be provided as desired. The ability to use fine glass or plastic filaments in the belt (1/32 inch diameter in "Lucite," for example) should enhance the opportunity to incorporate the pipes directly in the belts in the numbers and locations needed. Also, by varying the specific locations of inlets to the pipes at the slots in the buckle assembly for one car as compared to another, different keys will be required for different cars. Of course, this invention could also be used for other vehicles.

If desired, more than one LED can be used to supply the source of energy for optical light pipe conductors in the belt, belt buckle, and key. The receptors of conducted light can be photo transistors or equivalents. A clocked or chopper driven electrical output can be used for the LED's, and there may be internal feedback from LED emitter to photo transistor receptor to determine coherency of clocked or chopped signal. This can be done conventionally to prevent ambient light or unauthorized false light signals from activating ignition or starter switching.

It is thus seen that an ignition safety seat belt and buckle device according to the present invention provides a novel and advantageous safety means and device, providing control of electrical circuitry in response to seat belt buckling condition, and is able to provide associated electric circuitry with whatever type of electrical responsiveness or monitoring is desired in the system, and, provides the vehicle's ignition switch as a component carried on one of the buckle members.

Accordingly, it will thus be seen from the foregoing description of the invention according to this illustrative embodiment, considered with the accompanying drawings, that the present invention provides a new and useful dependable seat buckle device for carrying the vehicle's ignition switch and for monitoring associated electrical circuitry, the buckle device having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A seat belt buckle means providing a connection means for establishing one or more circuits as an incident to the establishing of the mechanical supporting connection of the buckle means, and comprising:

first and second co-operating buckle members releasably engageable for establishing the mechanical supporting connection of the buckle means;

co-operating optical conductor means on each of the buckle members, the respective optical conductor means being optically connected to and providing a portion of an associated opto-electrical circuitry, said optical conductor means being respectively operatively aligned with the buckle member components which establish the mechanical supporting connection, and thereby operatively aligned for co-operating with one another whenever and only whenever the said buckle members are co-operatively engaged and are establishing said mechanical supporting connection; and a key receivable in said first buckle member and including a portion of said optical conductor means therein, and removable from said buckle member to disable said opto-electrical circuitry.

2. The combination of claim 1 and further comprising:

strap means including optical conductor means associated with said optical conductor means in said buckle means.

3. The combination of claim 1 and further comprising:

additional opto-electrical circuitry; and additional optical conductor means in said key to enable said additional opto-electrical circuitry whenever said key is in said first buckle member, regardless of whether or not said buckle members are engaged, and disable said additional opto-electrical circuitry whenever said key is removed from said first buckle member.

4. The combination of claim 3 and further comprising:

a starter circuit coupled to the first mentioned opto-electrical circuitry; and an ignition circuit coupled to said additional opto-electrical circuitry.

* * * * *